United States Patent [19]

Kawamura et al.

[11] Patent Number: 5,563,886
[45] Date of Patent: Oct. 8, 1996

[54] ADDRESS ASSIGNMENT AND CONTROL OF A SINGLE CONNECTION TERMINAL DEVICE ON A BUS

[75] Inventors: Harumi Kawamura, Tokyo; Hisato Shima, Chiba; Makoto Sato; Yuko Iijima, both of Kanagawa, all of Japan

[73] Assignee: Sony Corporation, Tokyo, Japan

[21] Appl. No.: 391,019

[22] Filed: Feb. 21, 1995

[30] Foreign Application Priority Data

Feb. 24, 1994 [JP] Japan .................... 6-051246

[51] Int. Cl.⁶ ..................................... H04J 3/24
[52] U.S. Cl. ..................... 370/94.3; 370/85.1
[58] Field of Search ............... 370/94.3, 85.1, 370/92, 85.13; 340/825.25, 825.52; 395/281, 284, 306, 280

[56] References Cited

U.S. PATENT DOCUMENTS 4,959,713  9/1990  Morotomi et al. ............ 358/108
5,054,022  10/1991  van Steenbrugge .......... 370/85.6
5,394,556  2/1995  Oprescu ....................... 395/800

Primary Examiner—Douglas W. Olms
Assistant Examiner—Matthew C. Phillips
Attorney, Agent, or Firm—William S. Frommer; Alvin Sinderbrand

[57] ABSTRACT

A bus connects a plurality of electronic devices. The address of a prescribed electronic device having a single connection-terminal is assigned based on parent/child considerations. The prescribed device having a single connection terminal is controlled by a designated device so that other devices on the bus cannot directly communicate with the prescribed device other than through the designated device. In one embodiment, the bus is a P1394 audio/visual serial bus, the prescribed device is a camcorder, and the designated device is a VCR.

6 Claims, 5 Drawing Sheets

| connection conditions | node ID |
|---|---|
| not root | #3 |

| port 1 information | port 2 information | port 3 information |
|---|---|---|
| parent | child | child |

(a)

(b)

(c)

port n : camcoder connection terminal

CSP : cycle start packet

ADDRESS ASSIGNMENT AND CONTROL OF A SINGLE CONNECTION TERMINAL DEVICE ON A BUS

BACKGROUND OF THE INVENTION

1. Field of the Invention

The present invention relates to a system for carrying out communication between a plurality of electronic devices connected to a bus with which physical addresses are automatically assigned to the connected electronic devices, as with, for example, a P1394 serial bus.

2. Description of the Related Art

Conventionally, audio-visual (hereinafter abbreviated to "AV") communications systems using a P1394 serial bus have been considered for AV communications systems for sending and receiving control signals and digital AV signals between AV devices such as video cassette recorders (hereinafter referred to as "VCR's") and televisions (hereinafter referred to as TV's) connected by a digital bus.

An example of this kind of communications system will first be described with reference to FIG. 6. This communications system is equipped with the following AV devices: a TV, a VCR 1, a VCR 2 and a camcorder (hereinafter referred to as "CAM"). The CAM and the TV, the TV and the VCR 1, and the VCR 1 and the VCR 2 are connected by a P1394 serial bus capable of transmitting digital AV signals and control signals in a mixed state. Each device has a function for relaying control signals and digital AV signals on the P1394 serial bus.

FIG. 7 is a block diagram showing the basic construction of a VCR as an example of one of the AV devices present in the communications system in FIG. 6. This VCR is equipped with a deck 1, tuner 2, an operation part 3 which acts as a user interface, a display 4, a microcomputer 5 for carrying out the overall control of the operation of the VCR along with packet construction and address holding to be described later, a digital interface (hereinafter referred to as a digital I/F) 6 for a P1394 serial bus and a switch box 7 for changing over between the signals from the deck 1, tuner 2 and digital I/F 6. These are the basic blocks which make up a VCR. When the AV device is a TV, a monitor and antenna are set up in place of the deck 1 and the display 4 is not set up. In the case of a CAM, a camera is set up in place of the tuner 2.

In the communications system in FIG. 6, communications are carried out within a prescribed communications cycle (for example, 125 ms), as shown in FIG. 8. Both synchronous communications, where communications with data signals such as digital AV signals are consecutively carried out at a fixed data rate, and asynchronous communications where irregular transfers occur as deemed necessary by control signals such as connection control commands, can be carried out.

A cycle start packet CSP is present at the start of the communications cycle, after which a period is set up for sending packets for synchronous communications. It is possible to carry out a number of synchronous communications by assigning channel numbers 1, 2, 3, . . . N to the respective packets for carrying out synchronous communications. For example, if channel 1 is assigned for communications from the CAM to the VCR 1, the CAM sends a synchronous communications packet with the channel number 1 attached, directly after the cycle start packet CSP. The VCR monitors the bus and then takes in a synchronous communications packet with the channel number 1 attached so that communications can be carried out. If communications from the VCR 2 to the TV are then assigned to channel 2, communications from the CAM to the VCR 1 can be carried out at the same time as communications from the VCR 2 to the TV.

The period between the end of the sending of the synchronous communication packets for all of the channels and the next cycle start packet CSP is used for asynchronous communications. In FIG. 8, packets A and B are asynchronous communication packets.

When AV devices are connected in a communications system using a P1394 serial bus, node ID's (physical addresses) are assigned automatically in accordance with the connection conditions. In the case in FIG. 6, #0 to #3 are the node ID's. A simple explanation of the node ID layout procedure will now be given with reference to FIG. 9.

FIG. 9 shows a hierarchical structure where a leaf node B and a branch node C are connected a level down from a root node A and a leaf node D, and a leaf node E are connected a level down from a branch node C. To put it another way, node A is a parent node of node B and C, while node C is a parent of nodes D and E. First, the procedure for determining this hierarchical structure will be described.

When connections are made using a twisted pair cable for a P1394 serial bus between the nodes A and B, A and C, C and D and C and E, a node which has only one input/output port connected to another node informs the latter node that the latter node is a parent node.

In the case in FIG. 9, node B informs port 1 of node A that node A is a parent node, node D informs port 2 of node C that node C is a parent node, and node E informs port 3 of node C that node C is a parent node.

As a result, node A recognizes the connection of a child node at port 1, and informs node B from port 1 that node B is a child node. Node C also informs node D from port 2 that node D is a child node with port 3 of node E being informed from port 3 that node E is a child node.

Then, a node having a number of input/output ports connected to other nodes sends, to a node other than the nodes which have informed the first-mentioned node that the first-mentioned node is a parent node, a notice to the effect that the second-mentioned node is a parent node.

In the case in FIG. 9, node C sends an indication that node A is a parent node to port 2 of node A, and node A sends an indication to the effect that node C is a child node to port 1 of node C. At this time, the node which first receives an indication that it is a parent node actually becomes a parent node because indications that the opposing node is a parent node are communicated reciprocally between node A and node C. If indications that the opposing node is a parent node are communicated simultaneously, an indication that the opposing node is a parent node is recommunicated after a period of time randomly set up at each of the respective nodes. FIG. 9 shows the case where node A has become a parent node in this way.

In the above description, nodes B, D and E, each having only one input/output node connected to another node become child nodes as a result of informing the respective opposing nodes that the opposing nodes are parent nodes. However, for example, if the timing that node B informs node A that node A is a parent node is slow, and if node B is informed that it is a parent node, node B will become a root node.

Next, the procedure for assigning physical addresses to the respective nodes will be described. Basically, with the physical addressing of the nodes, the parent node gives permission for an address to be given to the child node. If there are a number of child nodes, for example, permission will be given to the child nodes in the ascending order of the numbers of the ports to which the child nodes are connected.

In FIG. 9, where node B is connected to port 1 of node A and node C is connected to port 2 of node A, node A gives permission for an address to be assigned to node B. Node B gives itself node ID #0 and data indicating that fact is sent to the bus.

Next, node A gives permission for an address to be assigned to node C. Node C then gives permission for an address to be given to node D connected at port 2. Node D then assigns node ID #1 to itself. Then, node C gives permission for an address to be given to node E connected at port 3. Node E assigns node ID #2 to itself. Node C then assigns itself node ID #3 once the address assignment for the child nodes D and E has been completed. Node A assigns itself node ID #4 once the address assignment for the child nodes B and C has been completed.

The details of a P1394 bus including this kind of node ID assignment procedure can be found in the "IEEE, P1394 serial bus specification" published on 14th of Oct., 1993.

There are the following prior applications:

1. European Laid-Open Number: 0614297;

2. Japanese Application Number: 05126682; and

3. Japanese Application Number: 05200055, by the same assignee as for this application, with U.S. patent applications for these three items pending.

In the aforementioned communications system, it is possible to know how many devices the system is constructed from by setting up a node ID table for all of the devices in the system for each device. Unfortunately, a device having a node ID which is the self-ID with one added on or a device having a node ID which is the self-ID with one taken away is not necessarily located at a neighboring position. For example, in FIG. 9, the node ID of the node to which the node having a node ID of #2 is directly connected is #3. However, the node ID of the node to which the node having a node ID of #0 is directly connected is #4.

The AV devices are assumed to have a number of ports because of the assumption that, in the case of a non-portable VCR, connections will be made with other non-portable VCR's and TV's, and CAM's etc. On the other hand, devices like CAM's, which are made to be portable, are assumed to have one port. However, means for selecting the device which is to be the communications opponent has to be set up though there is only one opponent directly connected.

A feature of conventional, non-portable analog VCR's (decks) is a CAM control function. This is a function where a directly connected CAM can be controlled etc. using the VCR operation panel. However, it is difficult to realize the control of a limited opponent as in the above CAM control in an AV communications system using a P1394 serial bus.

The present invention has been made to resolve these kinds of problems and therefore, it is an object of the present invention to provide an electronic device capable of controlling and communicating with a limited opponent in a communications system employing a P1394 serial bus etc.

SUMMARY OF THE INVENTION

In order to resolve the aforementioned problems, in an electronic device for a communications system having a bus and a plurality of electronic devices connected by the bus, constructed in such a manner that each of the electronic devices assigns itself an address after assigning addresses to electronic devices connected to its lower rank connection terminals in a prescribed order, comprising a plurality of connection terminals, connections amongst the plurality of connection terminals are decided in such a manner that a prescribed electronic device having a single connection terminal is connected to a finally address layout processed connection terminal.

Also, with this electronic device, the prescribed electronic device connected to the finally address layout processed connection terminal is defaulted to as a communications opponent, unless a particular opponent is designated. In this way, the operation of a prescribed electronic device can be controlled and AV signals can be sent and returned between this device and a prescribed AV device.

It follows that if, for example, the electronic device in this invention is taken to be a VCR and the prescribed electronic device is taken to be a camcorder (hereinafter referred to as "CAM"), CAM control can be carried out from the VCR.

This means that, according to the present invention, an opponent which is physically directly connected can be recognized even if there is a number of devices on a network. In this way, a default communications opponent can be decided particularly in cases where a connected opponent is not indicated, as in VCR CAM control.

Also, signals can be only sent to and received from an opponent which is physically directly connected even in the case where there are a number of devices on a network. Therefore, AV signal sending and receiving requests can be outputted to an opponent to which a device such as a CAM is directly connected.

BRIEF DESCRIPTION OF THE DRAWINGS

FIG. 2 is a view of the information possessed by node C in FIG. 1;

DETAILED DESCRIPTION OF THE PREFERRED EMBODIMENTS

Embodiment

Figures 1, 2A, 2B:
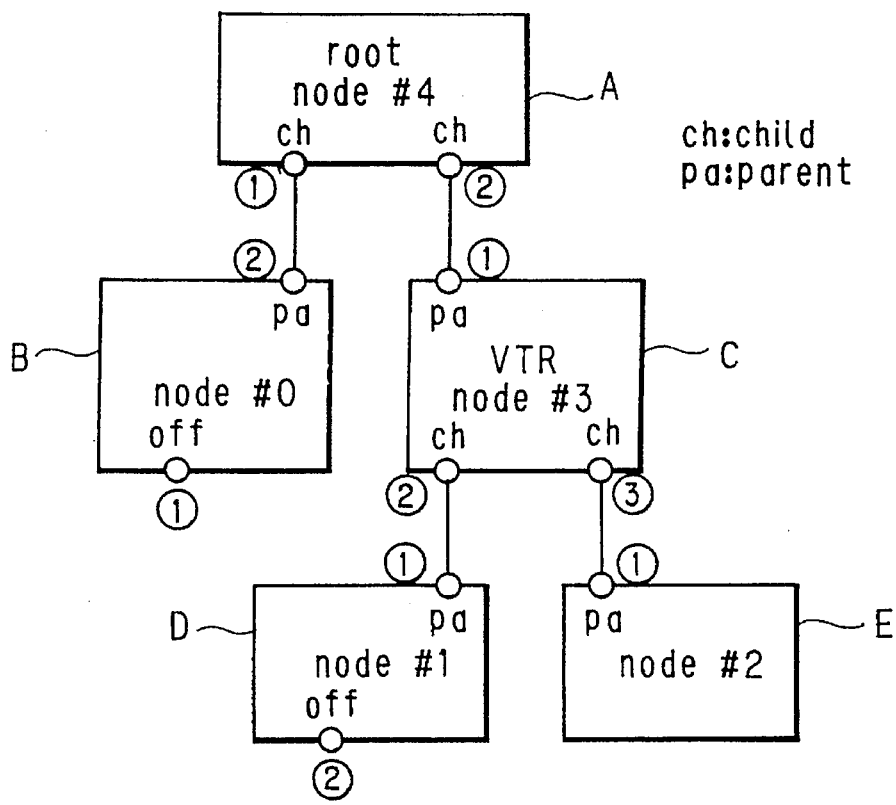
FIG. 1 is a view of an AV communications system to which the present invention is applied.

The following is a detailed description of the embodiments of this invention with reference to the diagrams. FIG. 1 is a view of an audio-visual communications system suitable for use with this invention. This audio-visual communications system is constructed from five devices, i.e. nodes A to E. The node ID for each device is shown in the diagram.

Port 1 of the node A, which is a root node, is connected to port 2 of node B. Port 2 of node A is connected to port 1 of node C.

Port 1 of node B is not connected to anything. Port 2 of node C is connected to port 1 of node D. Port 3 of node C is connected to port 1 of node E and port 2 of node D is not connected to anything.

In the diagram, if "ch" is assigned to a port this means that this port is connected to a "child" node and "pa" means that this port is connected to a "parent" node. "Off", on the other hand, means that this port is not connected to anywhere.

Each node possesses, as information relating to the node, connection conditions information, which shows whether or not it is itself a route node, along with a node ID. Information pertaining to whether or not each port is connected to a parent node or a child node, or simply not connected anywhere, is also possessed as port information. For example, the node in FIG. 1 which has the node ID #3 has the node information shown in FIG. 2 (*a*) and the port information shown in FIG. 2(*b*).

Figure 9:
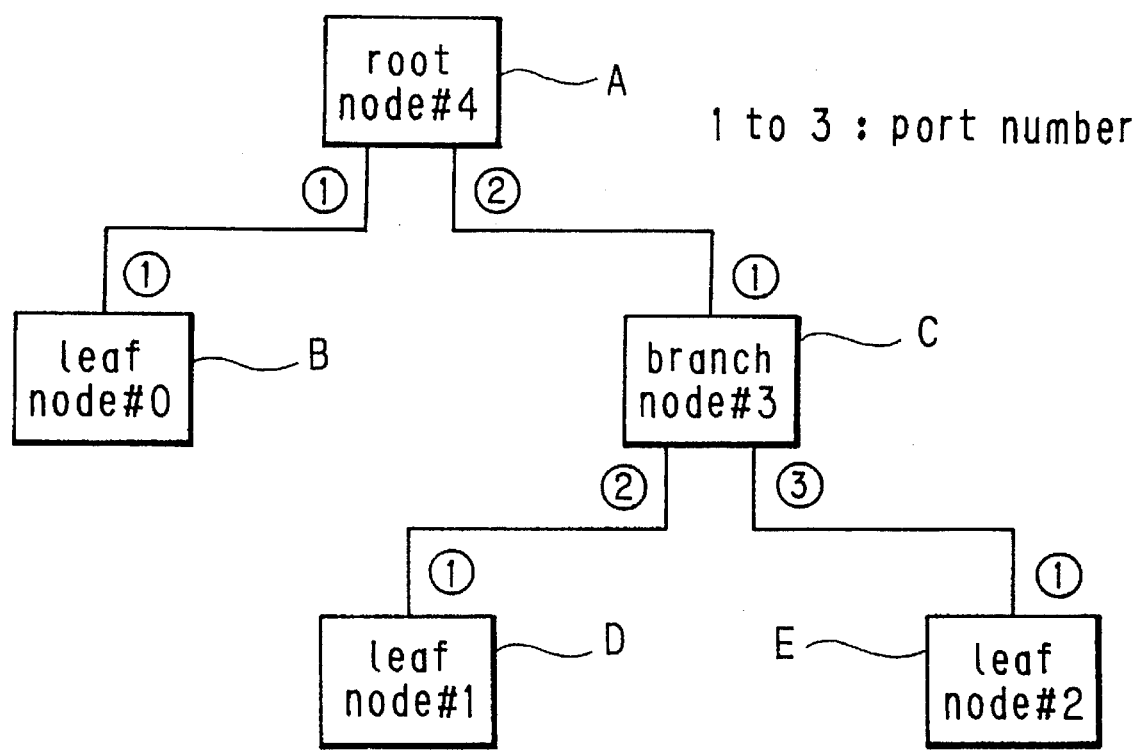
FIG. 9 is a diagram describing the node ID assignment procedure for a communications system using a P1394 serial bus.

As already described with reference to FIG. 9, a node in an upper level of a hierarchical structure allows nodes in a lower level of the hierarchical structure to be given node ID's in the ascending order of the numbers of the ports to which those nodes are connected. A node is then given its own ID once the nodes connected to all the ports have been given node ID's.

Therefore, the node in the upper level is given a node ID that is the node ID for the node connected to the port with the largest number, with one added on. For example, as shown in FIG. 1, the ID of node C is the ID #2 of node E connected to port 3 of node C with one added on, i.e. #3. The ID of node A is the ID of node C #3 with one added on i.e., ID #4.

When node C in FIG. 1 is a VCR (Video Cassette Recorder), port 3 is taken as a connection terminal for a camcorder. If the node E is then a camcorder, CAM control can be carried out in the same way as for an analog VCR. This goes on the presupposition that there is only one port at the camcorder.

A description will now be given of how a directly connected camcorder is recognized in the case where a deck carries out CAM control. Now, the port of the two ports of the deck for which the number is larger is assumed to be the connection terminal for the camcorder. The connection conditions for the deck and the camcorder at this time can then be considered to be as shown by the patterns in FIG. 3 (*a*) to (*c*).

Figure 3:
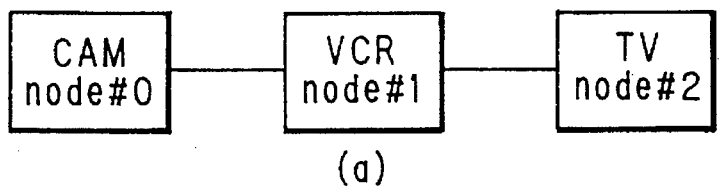
FIG. 3 is a view showing the connection pattern between a VCR having two ports and a CAM.
Figure 3:
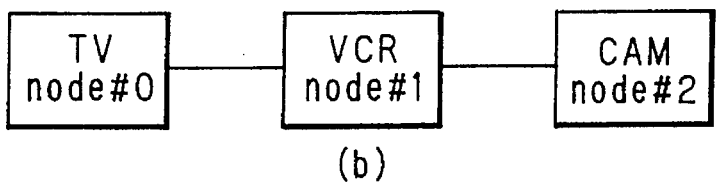
Figure 3:
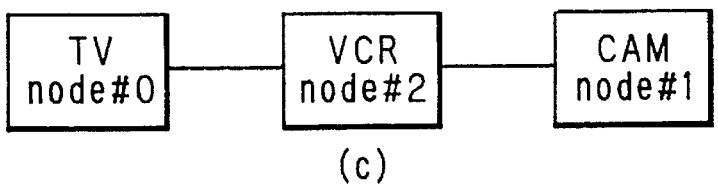

In FIG. 3 (*a*) and (*c*), the node ID for the camcorder is taken to be the node ID for the deck minus 1. Also, as shown in FIG. 3 (*b*), when the camcorder is the root node, the node ID for the camcorder is the deck ID plus 1.

Other nodes may be connected to nodes other than the deck and camcorder. However, they are omitted as the relationship between the positions of these two nodes doesn't change.

Figure 4:
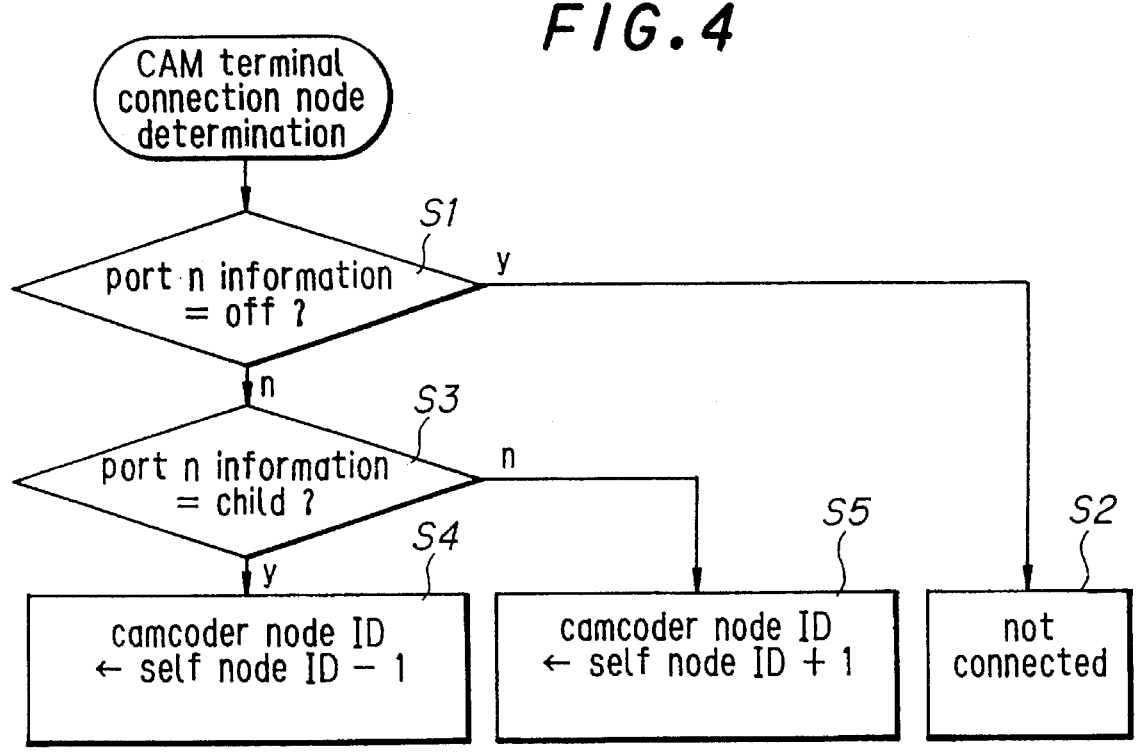
FIG. 4 is flowchart showing the VCR's procedure for knowing the ID of the CAM connected to the CAM connection terminal.

Next, the procedure for how the deck knows the ID for the camcorder connected to the connection terminal for the camcorder in the case where the connection terminal for the camcorder is decided as the port with the largest port number is described with reference to FIG. 4.

First, the deck investigates (S1) whether or not the port information for the connection terminal for the camcorder is "off". If it is "off", it is understood that nothing is connected (S2). If it is not "off", it is investigated whether or not the port information is "child" (S3). If the result is "child", the ID of the node for the camcorder connected to this port is given by subtracting 1 from the node ID of the deck itself (S4), with this corresponding to FIG. 3 (*a*) and FIG. 3(*c*). If the result is not "child", this will correspond to FIG. 3(*b*) and the ID will be obtained by adding 1 to the node ID of the deck itself (S5).

Figure 5:
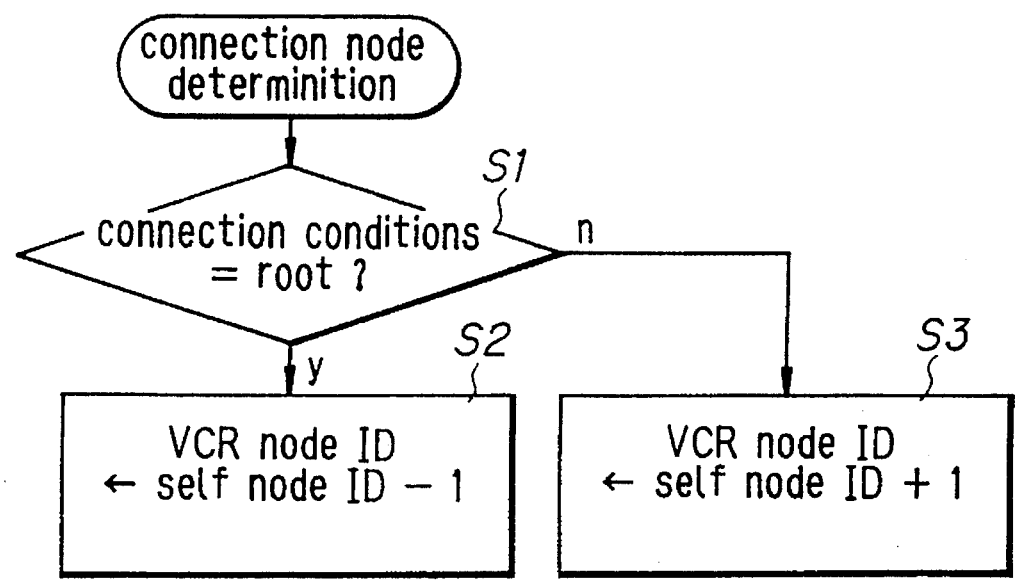
FIG. 5 is a flowchart showing the procedure the CAM follows to know the ID of the opponent to which it is itself connected.
Figure 6:
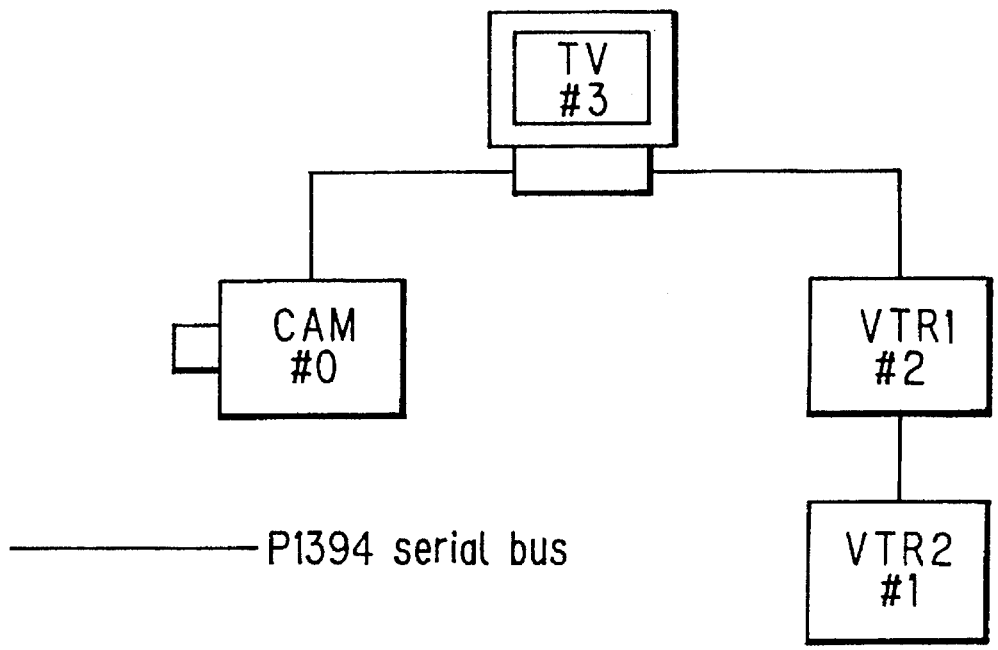
FIG. 6 is a view showing an example of an AV communications system using a P1394 serial bus.
Figure 7:
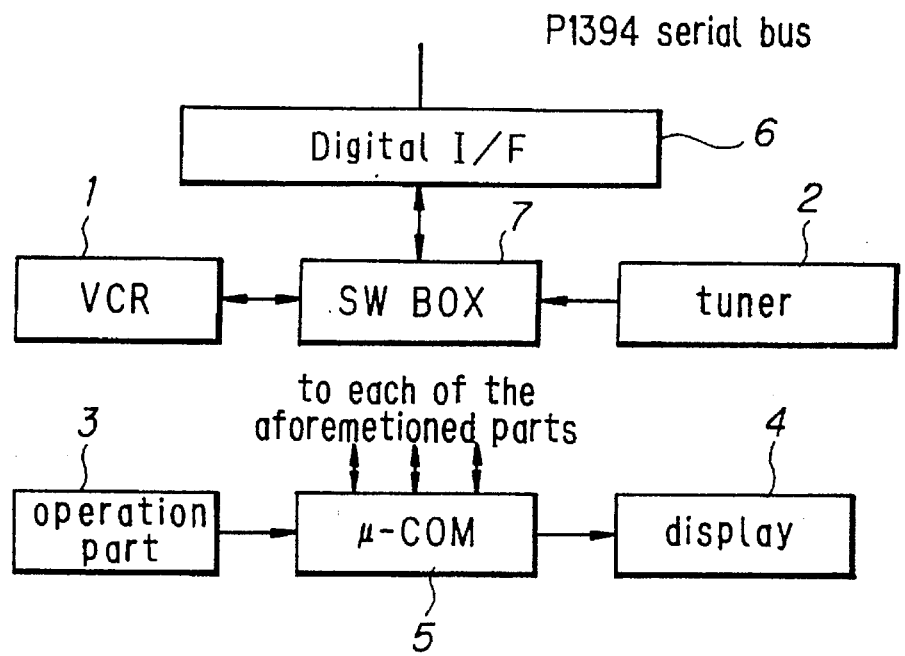
FIG. 7 is a view showing an outline of the structure of the AV devices present in the system in FIG. 6.
Figure 8:
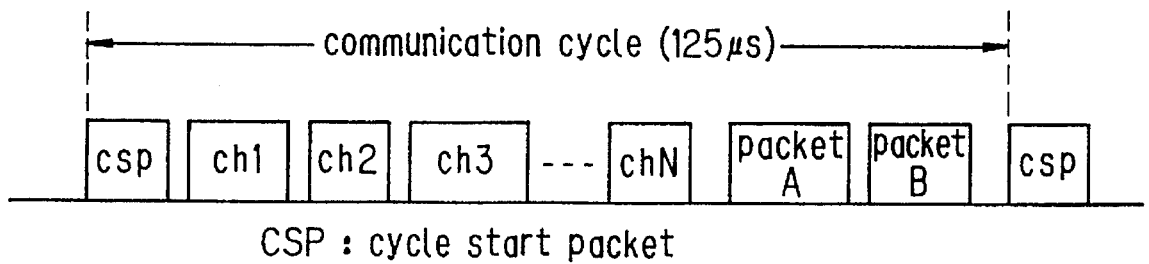
FIG. 8 is a view showing an example of a communications cycle for the system in FIG. 6.

Next, the procedure for how the camcorder knows the ID of the node to which it is directly connected is described with reference to FIG. 5. As only one port exists at a camcorder, it is sufficient merely to consider the cases where the camcorder is itself the root node and is not the root node (S1). The case where the camcorder is itself the root node corresponds to FIG. 3(*b*). The ID of the node to which the camcorder is connected is then obtained by subtracting 1 from its own ID (S2). In the case where the camcorder is in itself not a root node, as is the case in FIG. 3(*a*) and (*c*), the node ID of the apparatus itself with 1 added on then becomes the node ID of the node to which the camcorder is connected (S3).

In this way, the node ID assignment process at the time of re-setting the bus in the present invention is such that the port which is assigned last is taken to be the connection terminal for the camcorder. The node ID for the device to which the deck or camcorder is connected is then given by these devices adding or subtracting 1 to their own node ID's. As a result of this, defaults can be made such that communication is carried out between devices connected to a connection terminal for a camcorder which has not been designated.

An explanation has been given in the aforementioned embodiment giving the examples of a deck and a camcorder. However, a deck is merely one example of a device having a number of ports and a camcorder is simply one example of a device having one port. For example, a tuner may be considered in place of a camcorder, a tuner connection terminal may be set up on the deck, and a the tuner connected to this terminal may be taken as the default.

The concept of deciding the default for the communications opponent includes the case where the control opponent is limited (for example, a television and a CAM, or a television and a VCR) and the case where the target of transmission and receiving of AV signals is limited as in the relationship between the dubbing source and destination (for example, a television and a CAM, or a television and a VCR).

What is claimed is:

1. A method for determining a node ID of a first electronic device having a single connection terminal connectable to a port of a second electronic device, comprising the steps of:

reading by the second electronic device port information associated with the port, said port information representing whether said port is connected to a child node or a parent node and wherein said port information is stored in said second electronic device;

determining from said read port information whether the port is a child or a parent port;

connecting the first electronic device to said port;

assigning the first electronic device connected to the port a node ID representing said second electronic device minus one if said port is determined to be a child port; and assigning the first electronic device connected to the port the node ID representing said second electronic device plus one if said port is determined to be a parent port.

2. A method according to claim 1, further comprising the steps of assigning node information to the first electronic device indicative of whether said first electronic device is a root node, wherein said first electronic device is designated as the root node if the node ID of said first electronic device is equal to the node ID of said second electronic device plus one.

3. An electronic apparatus for a communications system having a bus and a plurality of electronic devices, each of said electronic devices having at least one connection terminal, comprising:

means for connecting said plurality of electronic devices to said bus;

means for storing node information associated with each of said electronic devices connected to said bus including address information representing the address of a respective electronic device, connection condition information indicating whether said respective electronic device is a root node, and port information for each connection terminal of said respective electronic device representing whether said connection terminal is connected to a child node or a parent node, or is not connected to any node;

means for assigning an address to each of said electronic devices after assigning addresses to its child nodes in a prescribed order;

means for operating the assigning means to assign an address to a prescribed electronic device having a single connection terminal which is directly connected to a further electronic device, wherein operation of the prescribed electronic device is controlled by a designated electronic device on said bus; and means for communicating audio and video signals for the prescribed electronic device only through said designated electronic device, such that said plurality of electronic devices on said bus cannot directly communicate with said prescribed electronic device other than through said designated electronic device.

4. An electronic apparatus according to claim 3, wherein said designated electronic device is said directly connected further electronic device.

5. An electronic apparatus according to claim 3, wherein the prescribed electronic device having a single connection terminal is a camcorder.

6. Method for controlling a communications system having a bus and a plurality of electronic devices, each of said electronic devices having at least one connection terminal, comprising:

connecting said plurality of electronic devices to said bus;

storing node information associated with each of said electronic devices connected to said bus including address information representing the address of a respective electronic device, connection condition information indicating whether said respective electronic device is a root node, and port information for each connection terminal of said respective electronic device representing whether said connection terminal is connected to a child node or a parent node, or is not connected to any node;

assigning an address to each of said electronic devices after assigning addresses to its child nodes in a prescribed order;

assigning an address to a prescribed electronic device having a single connection terminal which is directly connected to a further electronic device, wherein operation of the prescribed electronic device is controlled by a designated electronic device; and communicating audio and video signals for the prescribed electronic device only through said designated electronic device, wherein said plurality of electronic devices on said bus cannot directly communicate with said prescribed electronic device other than through said designated electronic device.

* * * * *